March 3, 1959

J. S. SENEY 2,875,609

EXTENSIONAL TESTER

Filed Jan. 7, 1955

INVENTOR
JOHN S. SENEY

BY *Charles A. McClure*

ATTORNEY

March 3, 1959

J. S. SENEY 2,875,609

EXTENSIONAL TESTER

Filed Jan. 7, 1955

INVENTOR
JOHN S. SENEY
BY Charles A. McClure
ATTORNEY

J. S. SENEY

2,875,609

EXTENSIONAL TESTER

Filed Jan. 7, 1955

INVENTOR
JOHN S. SENEY

BY Charles A. McClure

ATTORNEY

United States Patent Office 2,875,609
Patented Mar. 3, 1959

2,875,609

EXTENSIONAL TESTER

John S. Seney, Seaford, Del., assignor to E. I. du Pont de Nemours and Company, Wilmington, Del., a corporation of Delaware Application January 7, 1955, Serial No. 480,412

8 Claims. (Cl. 73—95.5)

This invention relates to testing of materials, concerning particularly machinery for determining stress-strain relationships in elongatable materials, notably yarn and other funicular materials.

As currently performed, measurement of the effect of an extending force upon yarn or similar elongatable material requires many repetitious and tiresome manual operations. Manual accomplishment of the necessary steps is costly, subject to error, and wasteful of intelligent human abilities utilizable to better purpose elsewhere.

A primary object of the present invention is completely automatic extensional testing of yarn and the like. Another object is repetitive break testing of a variety of elongatable materials without regard to individual variations in their extensional characteristics. Methods and means for accomplishing these and other objects will be apparent from the following description of the invention and the accompanying diagrams.

Figure 1:
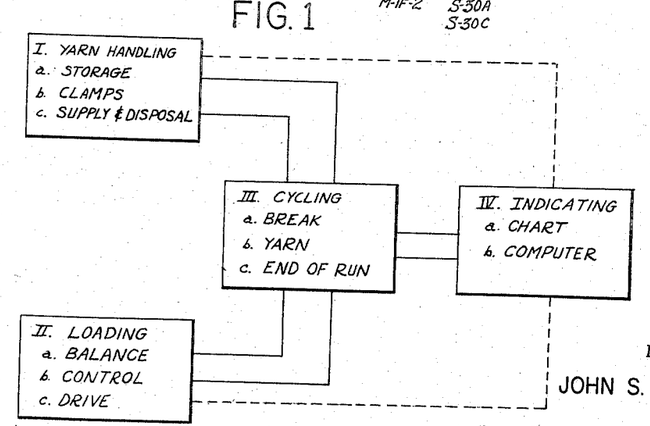
Figure 1 is a block diagram of apparatus of this invention identifying the various components and suggesting their respective functions and interactions.

As suggested in Figure 1, electrical connections (solid lines) connect the cycling component to each of the other three components (yarn handling, loading, and indicating), while mechanical connections (dashed lines) join the indicating component to each of the other two components in the latter group and join those two to one another. Details of the various interconnections appear in the subsequent drawings.

Figure 2:
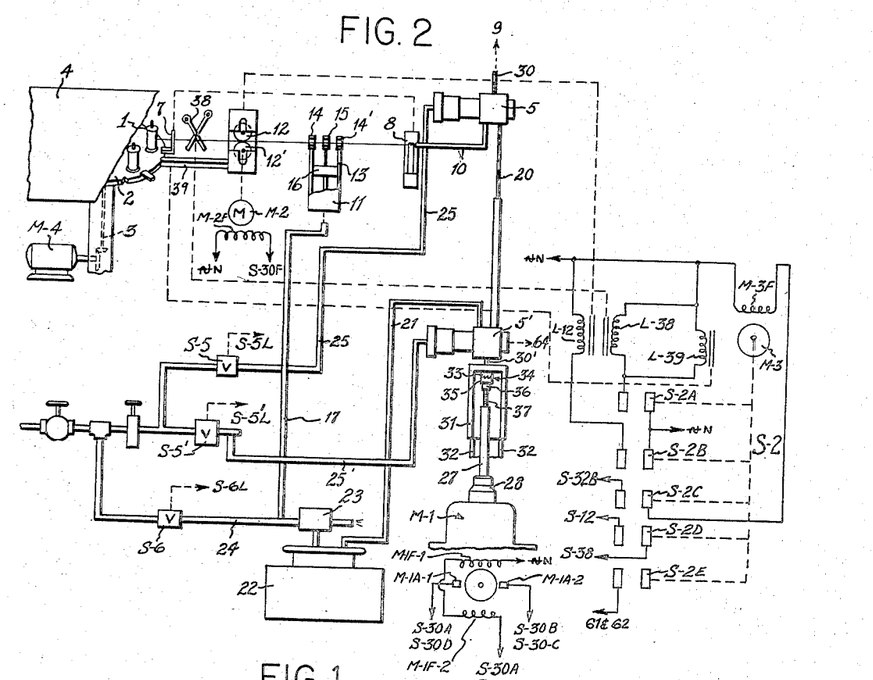
Figure 2 is a schematic representation of the yarn-handling component of the apparatus of Figure 1.

Figure 2 illustrates schematically the arrangement of storage, clamp, and supply-and-disposal subcomponents. As shown, bobbins 1 or similar packages of yarn are spaced at regular intervals on top of and near the periphery of turn table 2 carried on axle 3 subject to rotation by motor M–4 operatively connected thereto. Yarn from each bobbin is held by corresponding tension guide 7 mounted near the periphery of the turntable and spring clip 8 carried on a radial extension thereof, between which the yarn is strung beforehand, to align yarn from the bobbin to be used between the open blades of scissors 38 and the separated feed rolls 12 and 12' and into the guides of pretension device 11, the clip being located for yarn-releasing contact with the entrance of intake line 10. Hood 4 is cut away in the drawing to reveal these elements, whose separation is exaggerated for clarity, and latch 39 engaging a slot in the edge of the turntable opposite the bobbin. The pretension device comprises cylinder 13 having a pair of eyelet guides 14 and 14' located at opposite edges of the upper end thereof and intermediate guide 15 mounted on the end of piston 16 reciprocable within the cylinder from a position between the other guides, all three being open at one edge to permit entry of the yarn. Air line 17 is attached at the closed end of the cylinder.

Hollow intake or supply line 10 for the yarn leads to top clamp 5 from a position adjacent the pretension device. The pathway between the top and the bottom clamps is enclosed by hollow telescoping tube 20, and hollow disposal line 21 leads from bottom clamp 5' to collecting device 22 for the tested samples. Line 24 containing solenoid-actuated valve S–6 leads from a source of air pressure to aspirator 23 and thence to the atmosphere, terminating just after junction to the neck of this collecting device, and joined to this line is the line from the cylinder of the pretension device. Air lines 25 and 25' lead also from the pressure source to the respective clamps, these two lines being separately valved and solenoid-controlled, S–5 being the upper clamp valve and S–5' the lower.

Tie rod 30 supports the top clamp from one end of the beam in the balance subcomponent of the loading component, and tie rod 30' joins the lower clamp to traveler 31 carried on ways 32. The traveler connects to top plate 33 of over-riding clutch 34, bottom plate 35 having base 36 affixed to the top end of drive screw 37. Internally threaded sleeve 27 surrounding the screw is connected for rotation to spindle 28 of motor M–1, whose armature connects at side M–1A–1 to common contacts of S–30A and S–30D and at side M–1A–2 to common contacts of S–30B and S–30C, field winding M–1F–1 connecting to the neutral side of the power line and M–1F–2 to normally open contacts of S–30A and S–30C. A belt runs from the lower clamp to the chart subcomponent of the indicating component.

Also appearing in Figure 2 are timer motor M–3 and switch S–2 cam operated by this motor and having 5 sets of normally open contacts: S–2A to S–2E, inclusive. S–2A is located between the high side of the power line and solenoid L–38, which actuates scissors 38 located just off the edge of the turntable and in line with the entrance to line 10; this solenoid also actuates solenoid L–39 for table latch 39, which is adapted to engage a slot located in the edge of the turntable (a similar slot being near each bobbin) to position one of the bobbins opposite the entrance. S–2B similarly is in the line to solenoid L–12, which lifts the top feed roll located between the bobbin and the pretension device. S–2C is located between one side of field M–3F of the timer motor and switch S–32B in the cycling component. S–2D is between switches S–12 and S–38 of the cycling component. S–2E is in the break read-out lead between ground and computers 61 and 62 in the indicating component.

Figure 3A:
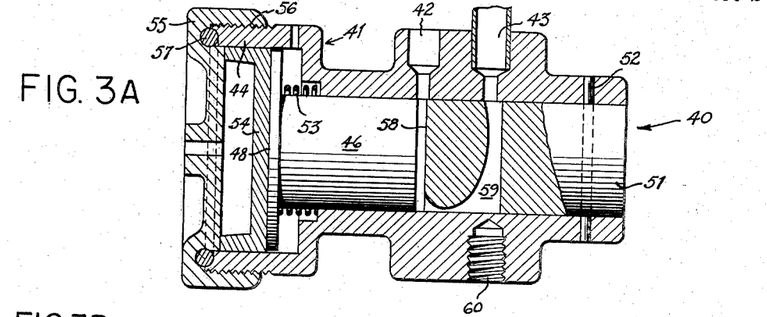
Figures 3A to 3H, inclusive, are a group of views of a clamping assembly of the yarn-handling component.
Figure 3B:
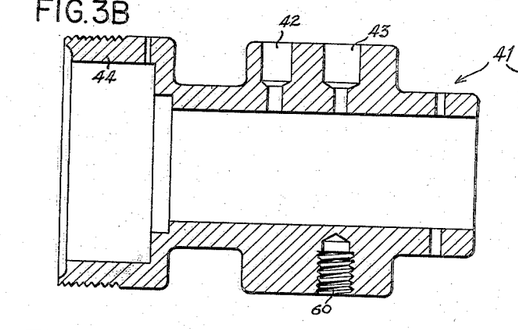
Figure 3C:
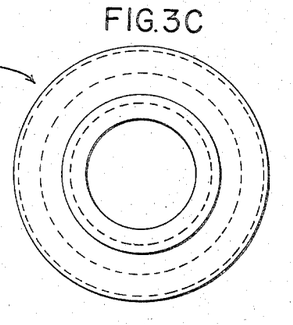
Figure 3D:
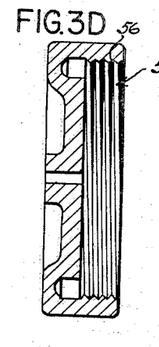
Figure 3E:
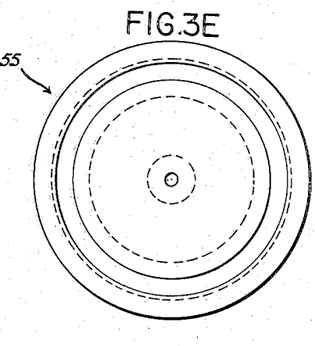
Figure 3F:
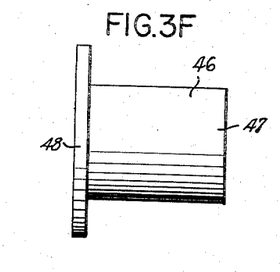
Figure 3G:
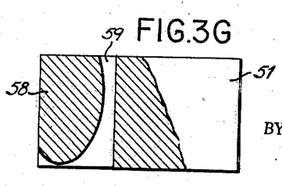
Figure 3H:
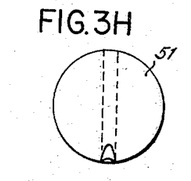

As shown first in longitudinal section in Figure 3A, each of the two identical clamping assemblies 40 comprises several pieces: stepped cylinder 40 bored through one side at two separate locations 42 and 43 to accommodate air lines, captive stepped cylindrical piston 46 whose smaller or free end 47 reaches to the vicinity of near bore 42, block 51 fixed in the path of the free end of the piston, pin 52 through the block and the sides of the cylinder to hold the block fixed therein, compression spring 53 between the shoulder of the piston and the enlarged end of the cylinder, piston-like diaphragm 54 adjacent flat 48 of the enlarged end or shoulder of the piston, cap 55 having internally threaded flange 56 fitting over threaded enlarged end 44 of the cylinder and bored axially to receive an air line, and toroidal gasket 57 between the flange of the cap and the enlarged end of the cylinder. The cylinder appears separately in Figure 3A (longitudinal section through the bores), Figure 3B (side elevation), and Figure 3C (end elevation). The outside of the cylinder has threaded recess 60 opposite the far bore to receive a tie rod. The retaining cap for the piston and adjacent diaphragm appears in axial section in Figure 3D, which clearly shows the internally threaded flange, and in end elevation in Figure 3E. The piston is shown separately in side elevation in Figure 3F. The clamping block appears in side elevation, partly in section, in Figure 3G; Figure 3H is an end elevation of the block showing the clamping face and terminus of the yarn passage therein. The block is pinned in place in the cylinder with clamping face 58 aligned with the near bore of the cylinder. Passage 59, of circular cross section except where it erupts on the side away from the air lines, leads from that edge of the clamping face through the block to a junction with far bore 43 of the cylinder. The curve of this passage approximates a logarithmic spiral.

Figure 4:
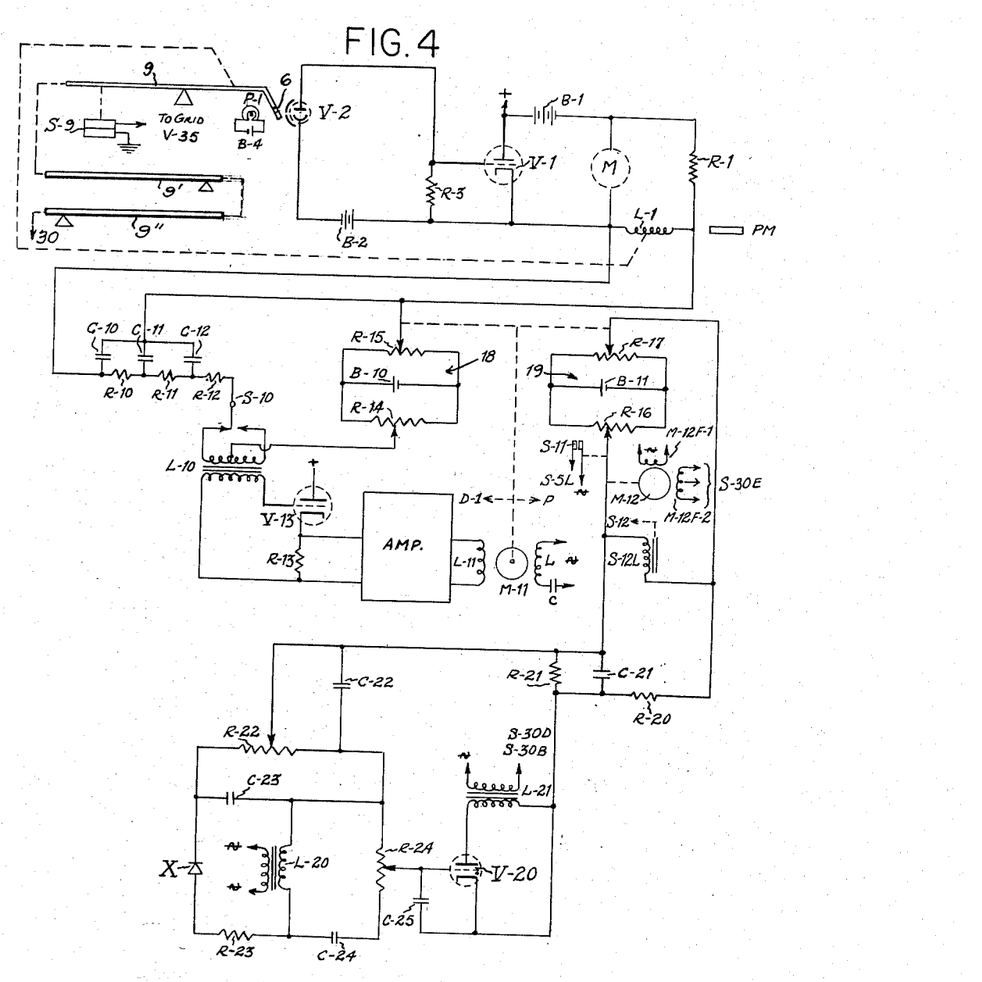
Figure 4 is a schematic representation of the loading component of the apparatus of Figure 1.

Figure 4 shows in simplified schematic form the loading component of the apparatus. The balance subcomponent takes up approximately the top third of the drawing. Electro-magnetically balanced beam 9 tied at one end to the upper clamp includes thermionic amplifier V-1 whose output leads connect to two bridges of the control subcomponent, the plate lead containing battery B-1 and resistor R-1 and connecting to the slider of R-15 of tension bridge 18 and to capacitors C-10, C-11, and C-12 of a filter network, the cathode lead from V-1 connecting directly to the junction of capacitor C-10 and resistor R-10, which also joins C-11 and R-11 of the filter network. The grid of V-1, which is separated from the cathode by resistor R-3 is connected to the collector of a phototube, the emitter being biased by battery B-2 with respect to the cathode of V-1. An arrangement of elements for an electromagnetically balanced beam similar to that of the balance subcomponent is described more fully in my copending patent application Serial No. 379,995 filed 9-14-53. Increased range of response is attained conveniently by "folding" the beam; the present apparatus includes a three-piece beam having lever arms 9, 9', 9" connected end to end and providing a mechanical advantage of about 2,000. Coil L-1 carried on the top arm 9 itself bridges the output leads, and slight variation in position of the beam alters the separation of this inductor and nearby permanent magnet PM. Movement of the beam varies light passage from lamp P-1 through aperture 6 in the top arm to phototube V-2 in the grid circuit of V-1. Switch S-9, which normally completes a circuit from the grid of reset thyratron V-35, is actuated by movement of the beam.

The slider of resistor R-14 of the tension bridge in the control subcomponent (the middle third of Figure 4) is manually adjustable; while the slider of resistor R-15, which with battery B-10 completes the bridge, is actuated by mechanical connection with balance motor M-11. The balance motor also actuates the slider for resistor R-17 of the second or loading bridge 19; the slider of R-16, which with battery B-11 completes the loading bridge, is connected mechanically to loading motor M-12. Field winding M-12F-1 of this motor is across the power line, while center-tapped field M-12F-2 connects to the three contacts of S-30E. Friction switch S-11 between solenoid S-51 of the upper clamp is closed only when the R-16 slider is moving in the loading direction. The output leads from the two sliders of the loading bridge go to the input leads of the drive subcomponent, which contains the main drive motor (M-1). The R-14 slider of the tension bridge connects to the center tap of converter inductor primary L-10, whose end taps flank vibrating contact of S-10 connected to R-12 of the filter. From the converter secondary leads go to cathode resistor R-13 and the grid of tube V-13 connected as a cathode follower, with its output feeding itno an A.-C. amplifier of conventional design whose output appears across field L-11 of balance motor M-11, whose other winding L connects across the A.-C. line through capacitor C. Solenoid S-12L of reset relay S-12 is connected across the output leads of this control subcomponent, i. e., the leads from the sliders of the loading bridge.

The circuit of the drive subcomponent, roughly the bottom third of Figure 4, includes a gas-filled thermionic tube V-20 of thyratron type, with the saturable primary of output transformer L-21 connected between its plate and cathode. The secondary of this transformer connects to the armature and one field coil of the main drive motor through normally open contacts of S-30B and S-30D, the other side of the secondary going to the high side of a conventional A.-C. power line. One of the input leads from the control circuit (from the slider of R-17 in the loading bridge) connects to the cathode of V-20 through resistor R-20. The other input lead (from the slider of R-16 of the loading bridge) connects to one side of a network located between the grid and the cathode of the drive thyratron (V-20). After joining resistor R-21 and capacitor C-21, whose other sides are tied to the cathode, this lead terminates at the slider of feedback control resistor R-22 and capacitor C-22. R-22 connects across one end of an R-C bridge formed of opposing capacitors C-23 and C-24 and resistors R-23 and R-24, the secondary winding of transformer L-20 joining C-23 with R-24 and R-23 with C-24. The primary winding of this transformer is connected across the A.-C. line, and crystal X between C-23 and R-23 half-rectifies the alternating signal so obtained. The slider of R-24 connects to the grid of the drive thyratron and is separated from the cathode by C-25. The primary of saturable reactor L-21 is directly across the cathode and the plate output leads.

Figure 5:
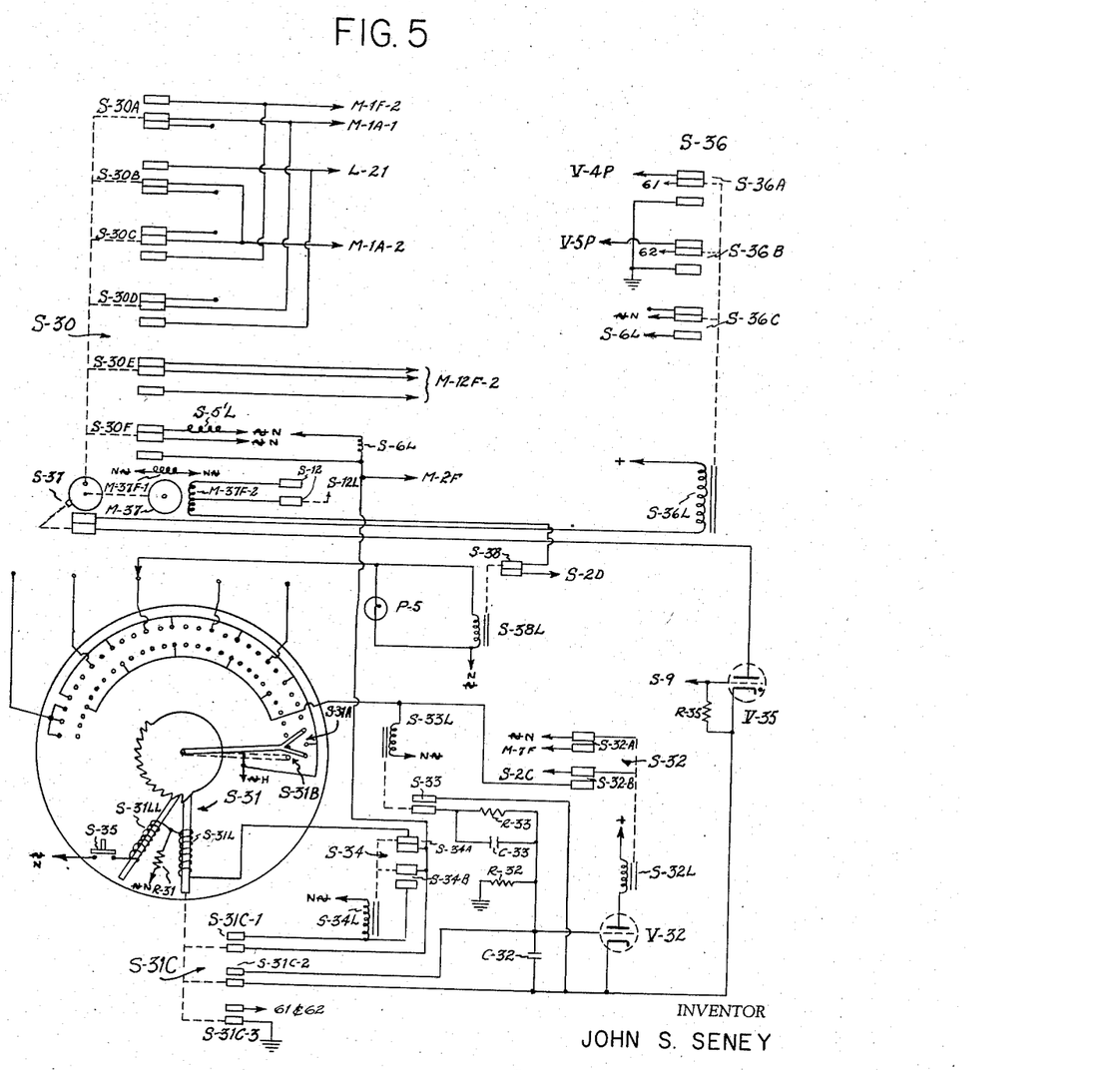
Figure 5 is a schematic representation of the cycling component of the apparatus of Figure 1.

Figure 5 shows the cycling component schematically. Perhaps most prominent is break switch S-30 which has half a dozen sets of contacts, S-30A through S-30E, each set consisting of one contact normally open, one normally closed, and a common center contact. All the center contacts are tripped by a spring-loaded arm connected through a crank shaft to rotary switch S-37 driven from cycle motor M-37. Field M-37F-1 of this motor is across the power line, and field M-37F-2, which is center-tapped, has the following connections: the top or clockwise winding and the centertap leading to normally open contacts of switch S-12 and the lower or counterclockwise winding to a contact of S-38, normally closed. Actuated by rotation of S-37 is a pair of normally closed contacts in circuit between the plate of thyratron V-35 and solenoid S-36L of break relay S-36. Not shown is arrangement by connection to the lower clamp tie rod for overthrow of the arm of the break switch in either direction to prevent possible damage to the apparatus. R-35 is grid resistor for thyratron V-35.

In the break switch, normally closed contact of the first set (S-30A) leads nowhere; the normally open contact of this set leads to the normally open contact of the third set (S-30C) and to field coil M-1F-2 of the drive motor; and the common contact of S-30A leads to the common contact of the fourth set (S-30D) and to side M-1A-1 of the armature winding of the drive motor. The normally closed contact of the second set (S-30B) of contacts of the break switch leads nowhere; the normally open contact of this set leads to the normally open contact of S-30D and to the output lead of L-21 (from the drive thyratron); and the common contact leads to the common contact of S-30C and to side M-1A-2 of the motor armature. The normally closed contacts of S-30C and S-30D lead nowhere, and the other contacts thereof have the connections just mentioned. The normally closed contact of the fifth set (S–30E) leads to the clockwise side of the center-tapped field winding (M–12F–2) of the loading motor; the normally open contact leads to the counterclockwise side of the center-tapped loading motor field; and the common contact leads to the center tap of the loading motor winding. The normally closed contact of the sixth set (S–30F) leads to solenoid S–5′L of the lower clamp valve; the normally open contact connects to field M–2F of feed-roll motor M–2, to solenoid S–6L for the aspirator valve (S–6), to the lower contact of both sets of step-up interlock relay S–34, and to one pair of normally open contacts in step-up relay S–31C; and the common contact leads to the high side of the power line.

Also important in the break-cycle subcomponent is break relay S–36, whose solenoid S–36L is interposed between a source of positive direct potential (+) provided by battery B–1 in the balance subcomponent and one contact of rotary reset switch S–37, as previously mentioned. The break relay has three sets of three contacts each, each including a normally open and a normally closed one with common contact in between. The normally closed contact of the first set (S–36A) leads to the collector of the tension-responsive phototube V–4 in the computer subcomponent of the indicating component, and the normally closed contact of the second set (S–36B) goes to a like element in the elongation-responsive photocell. The normally open contacts of both these sets go to ground, while the common contacts go to digital computing devices 61 and 62 for reading out tenacity and elongation, respectively. The normally closed contact of the third set (S–36C) leads nowhere; the normally open contact connects to one side of pen-lift solenoid L–6, the other side of which is connected to the neutral side of the power line; and the common contact of the third set connects to the high side of the power line. Step-up solenoid S–31L is connected to the neutral side of the line through protective resistor R–31 and on the other side to a contact of set S–34A, normally closed, of the step-up interlock relay S–34. One contact of each of the two pairs in this interlock relay is connected to the normally closed contact of S–30F in the break switch, as previously mentioned; the normally open contact of S–34B is connected to one side of interlock solenoid S–34L and to a contact of the first of three normally open sets of contacts in step-up relay S–31C, the cooperating contact of S–31C–1 returning to the other contact of the lower pair of S–34B. The other contact of the upper pair connects to one end of the step-up solenoid. The normally open contacts of S–34B set make before the normally closed contacts of S–34A break. Contacts S–31C–2 of the step-up relay are located in circuit between the cathode and grid of time-delay tube V–32. S–31C–3 contacts of the step-up relay are between ground and the break read-out lead to digital computers 61 and 62.

Yarn-cycle relay S–33 has a single pair of contacts, normally open, which in series with the parallel resistor-capacitor combination of R–33 and C–33 also join the cathode and grid of the time-delay tube, paralleling the S–31C–2 contacts of the step-up relay. The grid and cathode are joined also by large capacitor C–32, and the grid is separated from the ground by large resistor R–32. The plate of this tube is connected to positive direct potential through time-delay solenoid S–32L. Normally open contacts S–32A of the time-delay relay are interposed between the high side of the power line and winding M–7F of indexing motor M–7 in the chart subcomponent, the other side of the winding going to the neutral side of the line. Time-delay relay S–32 has another set of normally open contacts S–32B, mentioned below.

Also shown in Figure 5, the yarn-cycle subcomponent of the cycling component includes arcuate portions S–31A and S–31B of the step-up relay. One of the normally open S–32B contacts of the time-delay relay leads to every fifth contact of S–31B, which also connects to yarn-cycle solenoid S–33L. The other contact leads to one side of the winding for timer motor M–3 (Figure 2). Every fifth contact of S–31A, in the outer arcuate set of step-up relay S–31, is connected to the high side of the power line, as is the contacting arm of S–31B. The contacting arm of S–31A is insulated from the S–31B arm and is forked at the end to connect the two contacts immediately flanking any contact in that set (except, of course, the first and the last). The second contact after the second and each successive multiple of five S–31A contacts is connected to a separate binding post to which a lead from end-of-run solenoid S–38L is connected manually as desired. The end-of-run relay (S–38) has a single set of normally closed contacts in circuit between the counterclockwise field winding of cycle motor M–37 and switch S–2D of the set cam-actuated by the timer motor. The arms of S–31A and S–31B are fixed on a toothed wheel engaged by a ratchet pawl actuated by step-up solenoid S–31L and releasable by reset solenoid S–31LL upon closing of circuit thereto through R–31 by reset button S–35.

Figure 6:
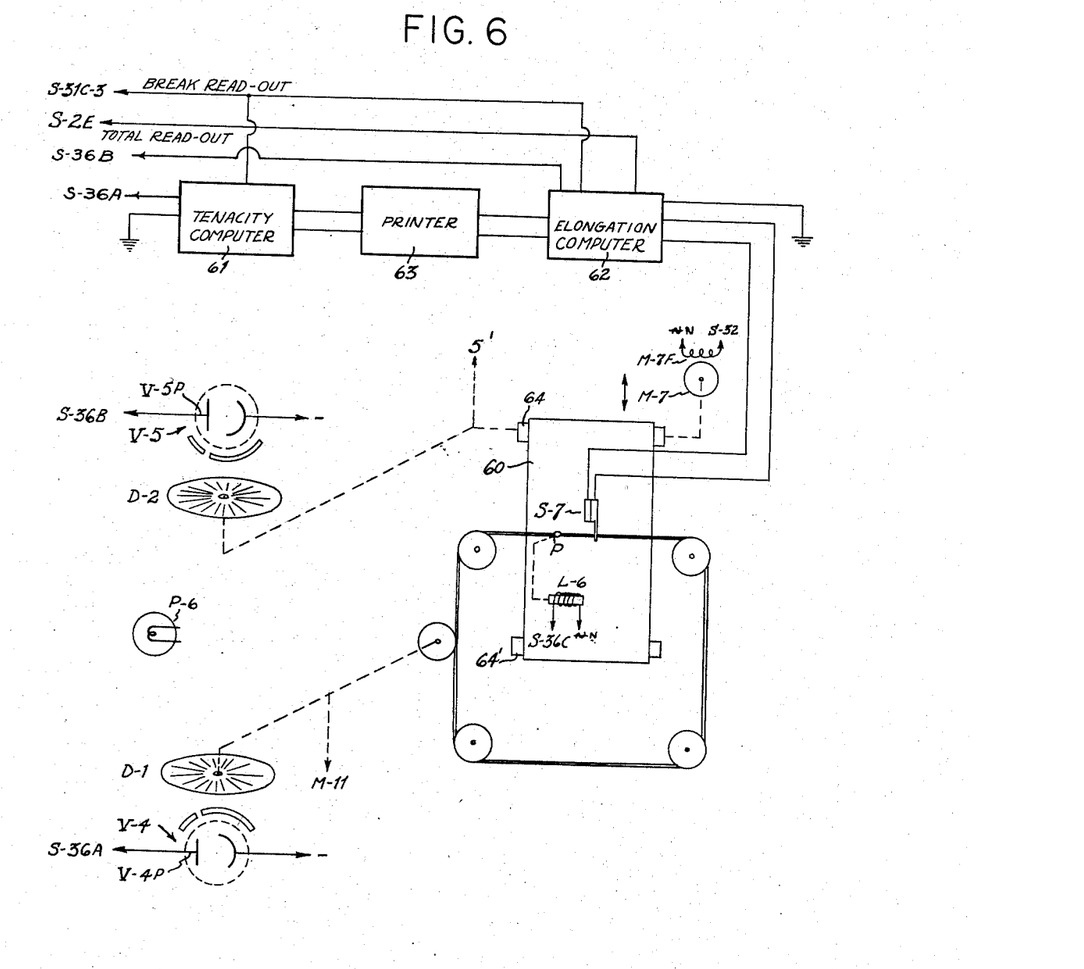
Figure 6 is a schematic representation of the indicating component of the apparatus of Figure 1.

The indicating component, shown schematically in Figure 6, includes chart and computer subcomponents, the former providing a graphical representation of the test results and the latter a numerical representation. Chart 60 supported for vertical movement on upper and lower rolls 64 and 64′ presents the amount of extension along the ordinate and the extensional force along the abscissa, moving under pen P by connection with the lower clamp. Horizontal movement of the pen is controlled by connection to the balance motor, as represented by an arrangement of belt and pulleys. The upper roll is rotated by movement of the lower clamp, to which it is connected as indicated by the dashed line. Index motor M–7, which is operated momentarily through the time-delay relay at the end of each break, also connects to the driven supporting roll so as to displace the chart slightly between tests to prevent coincidence of the resultant traces.

As shown in Figure 6, two shutter discs D–1 and D–2 with radial light-transmissive regions are driven by respective motors M–11 and M–1 for rotation in the paths of beams of light directed from bulb P–6 toward separate phototubes V–4 and V–5. The emitters of the phototubes are connected to a suitable source of negative direct potential (−). Collector V–5P of the elongation-responsive tube leads through normally closed S–36B contacts of the break-reset relay to the digital computer that reads elongation, and collector V–4P of the tension-responsive tube leads through a similar set of contacts to the tenacity-indicating digital computer. The digital computers are of conventional design with suitable storage for totaling and averaging repeated tests. Their readings are printed in numerical form by printer 63. Supported above the chart at a chosen abscissa is switch S–7 with a pair of normally closed contacts opened when the pen reaches that reading, rendering inactive an element of the elongation-responsive computer that picks off the data at this desired level. Another element of this computer continues to respond to the change in length until the yarn breaks.

Operation of the apparatus is readily understood. Of course, the main air valve must be open to provide automatic transport of the yarn through the lines and between the clamps. Assume that the power supply also is operating. Momentary depression of the reset button by the operator energizes the reset ratchet solenoid permitting spring return of both arms of the step-up relay to starting position (shown). This movement of the arms breaks the circuit from the high side of the power line through contacts of the arcuate portions of the step-up relay to the end-of-run selector, deenergizing the end-of-run solenoid and closing normally closed contacts to the lower half winding of the cycle motor through the following holding circuit: normally closed cam contacts (an interlock to prevent start-up during changing of yarn samples), break interlock (closed because lower clamp stops in up position), to center tap of cycle motor winding, which shorts out the lower half winding, producing counterclockwise rotation of the motor. The cycle motor rotates the rotary switch counterclockwise, opening normally closed thyratron reset contacts momentary; the rotation also pulls the arm of the break switch down, drawing sets A and B of the break switch contacts to the abnormal position and sets C to E, inclusive, to normal position.

The normally closed contacts of set D of the break switch complete a circuit shorting out clockwise half of the loading motor winding, breaking of formerly closed normally opened contacts of this set shorting out the counterclockwise half of the winding, whereupon the slider driven thereby moves clockwise away from zero; this movement of the R–16 slider closes the upper clamp hold switch. Closing of this switch actuates upper clamp solenoid to open the upper clamp valve, thus supplying air to close the upper clamp. The normally open contacts of set B of the break switch close upon movement of the arm to complete a circuit from the upper end of the drive motor armature (the clockwise half) to the drive motor field, thus preparing the drive motor for rotation counterclockwise, which corresponds to movement of the sleeve up the screw to lower the lower clamp. As the loading motor slider moves farther from zero, output from the loading bridge increases as an error signal to the drive circuit, firing the drive thyratron and sending current through the primary of the saturable output reactor, reducing the impedance of the secondary and permitting potential to appear across the drive motor fields. Resulting proportional rotation of the drive motor rotates the sleeve and pulls the lower clamp downward. This movement of the lower clamp extends the clamped yarn, raising the yarn tension accordingly. Slight downward deflection of the left end of lower arm 9 of the balance beam, which is attached to the upper clamp, is magnified by connected intermediate arm 9', which in turn reacts upon top arm 9. Resultant raising of the right end of the top arm causes less light to reach the phototube; this leads to increased output from the beam amplifier to the tension bridge. Output from the tension bridge operates the balance motor through the balance amplifier and positions the slider of the tension bridge to balance; corresponding positioning of the attached slider of the loading bridge compensates for the extension produced in the yarn, thus providing constant tension increments per unit time regardless of the elongation characterisics of the yarn. Movement of the lower clamp away from its uppermost position opens the contacts of the break interlock, breaking the circuit that formerly shorted the lower half of the cycle motor winding.

Sooner or later in the downward movement of the lower clamp, the yarn breaks. The sudden release of tension on the beam whips it sufficiently to open the beam switch momentarily, removing negative grid potential from the reset thyratron, which then conducts. Conduction in this tube, which continues until the plate potential is removed subsequently by opening of the thyratron reset contact on the rotary switch, actuates the break solenoid. The break solenoid opens normally closed contacts of the break switch, supplying potential to the pen-lift solenoid and breaking the circuits from the collectors of the two phototubes supplying the digital computers. Thus, all the data transmission ceases as soon as the yarn breaks.

Unbalance of the tension bridge just after the moment of break is considerable; this reverses the balance motor to send the slider of the tension bridge and the connected slider of the loading bridge back toward zero. This movement of the loading bridge R–17 slider greatly increases the output from the loading bridge because the loading motor still is driving the R–16 slider away from zero.

Resulting great unbalance of the loading bridge actuates the break-reset solenoid, closing normally open contacts of the break-reset relay, which produces the following results: shorting top half winding of the cycle motor, starting rotation of the motor clockwise to turn the rotary switch and raise the break switch arm. This rotation returns sets A and B of the break switch contacts to normal position and places contacts of sets C through E to abnormal position.

The action of the break switch now is opposite to that previously discussed. Sets C and D of the contacts reverse the armature connections to the drive motor, starting the lower clamp back up toward its original position. The drive motor continues to run until no error signal remains in the output from the loading bridge, whose loading slider now is being returned towards zero by completion of a circuit through closed normally open contacts of set E of the break switch contacts. The overriding clutch at the junction between the drive screw and the traveler tied to the lower clamp takes up any overrun after the clamp reaches the stop at its uppermost position, at which time the contacts of the break interlock close to short out bottom half of the cycle motor winding through normally closed contacts of the end-of-run relay (the top half of which already is shorted out by closed normally open contacts of the break-reset relay). Reversal of the loading slider opens the loading switch, which operates unidirectionally, breaking the circuit to the upper clamp solenoid; this closes the upper clamp valve to remove pressure from the upper clamp, which then opens.

Closing of normally open contacts of set F of the break switch completes the circuit from the high side of the power line to the aspirator solenoid, opening the aspirator valve to produce subatmospheric pressure in the collecting device; these contacts also complete a circuit to the winding of the feed roll motor and also complete a circuit through normally closed contacts of the top set of the step-up interlock to the step-up solenoid, which pulls the step-up switch armature upward. This movement of the step-up switch advances the arms one notch in the arc and momentarily closes all three normally open sets of contacts: one completing a circuit from the high line to the solenoid of the step-up interlock, actuating it, and first closing normally open contacts of the interlock (to provide an alternate path from the line to the stepup interlock solenoid and holding it in the thrown position) then opening normally closed contacts of the step-up interlock, removing potential from the step-up solenoid, whereupon the spring return moves the armature downward in a ratchet action; in the meantime, closing of normally open second set of contacts of step-up switch shunts out the large capacitor in the grid-to-cathode circuit of the time-delay tube, which soon reduces the grid potential sufficiently to allow the tube to conduct, actuating the time-delay solenoid momentarily and thus temporarily closing two sets of normally open contacts of the time-delay relay. Closing of the third set of normally open contacts of the step-up switch grounds the computers, causing them to read out and reset for the next measurement. The top set of contacts of the time-delay relay completes a circuit to supply potential to the index motor, the lower set making contact to every fifth contact on the inner arcuate set of the step-up switch so as to enable connection with the high side of the power line through the switch arm at every fifth break.

The effect of this at a fifth break is to provide potential momentarily through the lower set of contacts of the time-delay relay to the timer motor, which begins to rotate the connected cam, thereby providing an alternate path for potential to the motor field until the cam breaks afer completion of a complete rotation, the time-delay contacts opening soon after the timer motor rotation begins. Closing of the respective cam contacts causes the scissors to cut the yarn, the drive rolls to separate, and the turntable latch to withdraw, whereupon the next bobbin is moved into position by rotation of the turntable. Additional cam contacts actuated by the timer motor open in the circuit to the break interlock during yarn repositioning and close to bring about the totalling and averaging read-outs of the computers. Also actuated by completion of the circuit through the switch arm at every fifth break is the solenoid of the yarn-cycle relay which closes normally open contacts to place added capacitance in the grid-to-cathode circuit of the time-delay tube, in parallel with the original large capacitor, to provide a greater period of indexing by lengthening the conduction time of the tube. After yarn from several successive bobbins has been tested the forked S-31A arm closes a circuit through the selected binding post to the end-of-run relay, which interrupts the action of the cycle motor until the operator again presses the rest button, and lights pilot lamp P-5.

Opening of the normally closed contacts of the sixth set of the break switch opens the circuit to the lower clamp solenoid, closing the lower clamp valve to remove pressure from the lower clamp. Opening of the lower clamp permits the broken pieces of yarn to pass through the exhaust line into the collecting device. The yarn guides of the pretension device are aligned because pressure in the aspirator line pushes the pretension piston up; new yarn is drawn into the testing line by air flow through it upon rotation of the feed rolls. Eventually, when the loading slider reaches zero, the absence of output from the tension bridge allows the break-reset solenoid to drop out, breaking the short circuit of the top half of the cycle motor winding, which turns the rotary switch and pulls the arm of the break switch down, whereupon the lower clamp closes and the aspirator valve closes to permit the pretension piston to fall. The upper clamp closes a short time later when the loading motor slider moves far enough to open the loading switch, and the testing operation is repeated on the new sample of yarn.

Although the operating sequence is rather complex, the apparatus requires little maintenance or supervision. The advantages to the operator of preparing a set of yarn samples, perhaps enough for half a day or longer, and then only returning to obtain the results of break-testing in desired graphical or numerical form are obvious. The hood may be heated so that oven-dry results are assured. The apparatus, although set up and described for five tests of yarn from each of five or six bobbins, may be set for the desired number of tests from a desired number of packages. Of course, other elongatable materials besides yarn may be tested similarly. The apparatus of the present invention lends itself to modification in design and function without the necessity of a departure from the inventive concept embodied therein.

The claimed invention:

1. Apparatus comprising yarn-handling means for withdrawing yarn from a source of supply, a pair of clamps spaced from one another and adapted to grip and extend the yarn, one of the clamps being connected by fluid-conducting means to the yarn handling means, the other clamp being connected to disposal means for the yarn by other fluid-conducting means, and the two clamps being connected to one another by extensible fluid-conducting means constituting a testing channel for the yarn; loading means for actuating the yarn-handling means to extend the yarn; indicator means for indicating the extension so accomplished and the accompanying extensional force; and cycling means for actuating the yarn-handling means, the pair of clamps, and the disposal means.

2. The apparatus of claim 1 in which the loading means includes balance means connected to one of the clamps and responsive to extensional force applied to the yarn, control means effective to fix the rate at which the extensional force is applied to the yarn and to maintain the balance means normally balanced, and drive means responsive to the control means and adapted to move the other of the clamps away from the clamp connected to the balance means, thereby applying extensional force to the yarn gripped by the clamps.

3. Apparatus comprising means for feeding yarn along a path past a pair of yarn-gripping means spaced from one another along the yarn path, means for actuating the gripping means to seize a known length of yarn therebetween, means including a beam normally balanced by electromagnetic means responsive to external force applied to the yarn for increasing gradually the separation of one gripping means from the other and thereby tensioning the yarn, means for controlling the rate of separation of the gripping means to ensure application of constant increments of tensioning force to the yarn per unit time independent of resulting extension of the yarn, and means for indicating the relationship between applied tensioning force and resulting extension of the yarn.

4. In yarn-testing apparatus, the improvement comprising electromechanical loading means including a beam normally balanced by electromagnetic means responsive to extensional force applied to yarn under test, a control circuit containing an extensional-force-responsive bridge whose output is applied to keep the beam in balance and a loading bridge whose output increases at a controlled rate, and a drive circuit responsive to the output signal of the loading bridge and containing a motor actuated thereby to apply extensional force to the yarn under test.

5. The apparatus of claim 4 wherein a slidewire with a slide is located on each of the extensional-force-responsive bridge and the loading bridge, the extensional-force-responsive bridge slide being positioned to balance the bridge responsive to the extensional force and mechanically connected with the loading bridge slide so that movement of the extensional-force-responsive slide causes the loading bridge slide to introduce a corresponding signal to the loading bridge, whereby the output of the loading bridge is rendered independent of the extension produced in the yarn under test.

6. In yarn-testing apparatus having a pair of clamps adapted to close and grip a length of yarn therebetween and to open and release the yarn subsequently and means for increasing separation of the clamps from one another while closed, the improvement comprising means for locating an unbroken length of yarn against both clamps while open, means for closing the clamps in succession, and means located adjacent one of the clamps for applying a tautening tension to the yarn at a time after the closing of the other clamp and before the closing of the adjacent clamp, whereby the length of yarn between the clamps is taut by the time when the last clamp closes to grip it, said means located adjacent one of the clamps comprising a cylinder, a reciprocable piston mounted within said cylinder, and a guide member attached to said piston adapted to receive the length of yarn being tested.

7. In yarn-testing apparatus having a pair of clamps adapted to close and grip a length of yarn therebetween and to open and release the yarn subsequently and means for increasing separation of the clamps from one another while closed, the improvement comprising means for locating an unbroken length of yarn against both clamps while open, means for closing the clamps in succession, and means located adjacent one of the clamps for applying a tautening tension to the yarn at a time after the closing of the other clamp and before the closing of the adjacent clamp including a cylinder, a reciprocable piston mounted within said cylinder, and a guide member attached to said piston adapted to receive the length of yarn being tested, wherein one end of said cylinder is attached to a fluid conducting means responsive to the closing and opening of the other clamp, whereby said piston is lowered after the closing of the other clamp and raised to its original position after the opening of the other clamp.

8. In yarn-testing apparatus, the improvement comprising a clamping assembly having a cylindrical housing fitted at one end with fluid-conducting means and containing a piston spring-loaded toward the fluid-conducting means and, upon admission of fluid thereby into the end of the housing, reciprocable away therefrom into contact with a block filling the opposite end of the housing and having a passage through the body thereof terminating at one edge of the block opposite the piston, the housing having a passage therethrough coaxial with the passage through the block body and having another passage therethrough on the same side thereof at a location terminating between the opposing faces of the piston and the block.

References Cited in the file of this patent

UNITED STATES PATENTS

| | | |
|---|---|---|
| 1,327,393 | Jury | Jan. 6, 1920 |
| 2,142,251 | Nunan | Jan. 3, 1939 |
| 2,407,545 | Fish | Sept. 10, 1946 |
| 2,411,450 | Miller | Nov. 19, 1946 |
| 2,590,398 | Gegenschatz | Mar. 25, 1952 |

UNITED STATES PATENT OFFICE
CERTIFICATE OF CORRECTION

Patent No. 2,875,609                          March 3, 1959

John S. Seney

It is hereby certified that error appears in the printed specification of the above numbered patent requiring correction and that the said Letters Patent should read as corrected below.

Column 2, line 59, for "40" read -- 41 --; column 3, line 67, for "S-51" read -- S-5L --; column 4, line 2, for "itno" read -- into --; column 7, line 38, for "9" read -- 9ʺ --; column 9, line 17, for "rest" read -- reset --.

Signed and sealed this 4th day of August 1959.

(SEAL)

Attest:
KARL H. AXLINE

Attesting Officer

ROBERT C. WATSON
Commissioner of Patents